United States Patent
Stokes et al.

[15] 3,676,774
[45] July 11, 1972

[54] POTENTIOMETRIC RESISTANCE MEASURING SYSTEM

[72] Inventors: Joseph F. Stokes, Middlebury; George E. Van Vessem, Naugatuck, both of Conn.

[73] Assignee: American Chain & Cable Company, Inc., New York, N.Y.

[22] Filed: May 5, 1970

[21] Appl. No.: 34,850

[52] U.S. Cl. ................................324/57, 324/63, 324/98
[51] Int. Cl. ............................G01r 31/00, G01r 27/00
[58] Field of Search ..................324/57, 63, 65, 98; 333/14, 333/15

[56] References Cited

UNITED STATES PATENTS

| | | | |
|---|---|---|---|
| 2,151,821 | 3/1939 | Wilson | 333/14 |
| 2,906,951 | 9/1959 | Van Blerkon | 324/63 |
| 2,087,316 | 7/1937 | Doba | 333/14 |
| 3,423,680 | 1/1969 | Julie | 324/63 |
| 2,924,384 | 2/1960 | Porter | 324/63 |
| 2,328,951 | 9/1943 | Bryant | 333/14 |
| 2,976,486 | 3/1961 | Gilbert | 324/63 |

*Primary Examiner*—Herman Karl Saalbach
*Assistant Examiner*—C. Baraff
*Attorney*—Pennie, Edmonds, Morton, Taylor and Adams

[57] ABSTRACT

A system for measuring the resistance of a current-carrying inductive element comprises a pair of coupled, self-balancing potentiometers and an adjustable voltage delay circuit. One of the potentiometers is adapted for measuring the element voltage (after it is subjected to a predetermined time delay) by comparing it with a constant reference voltage. The other potentiometer is adapted for measuring the element resistance by comparing this measured element voltage with a voltage corresponding to the current through the element. The time delay introduced in the voltage measurement is chosen to delay voltage transients by a time equal to the inductive time lag of the element current, so that the resistance measurement is not significantly affected by such transients.

6 Claims, 2 Drawing Figures

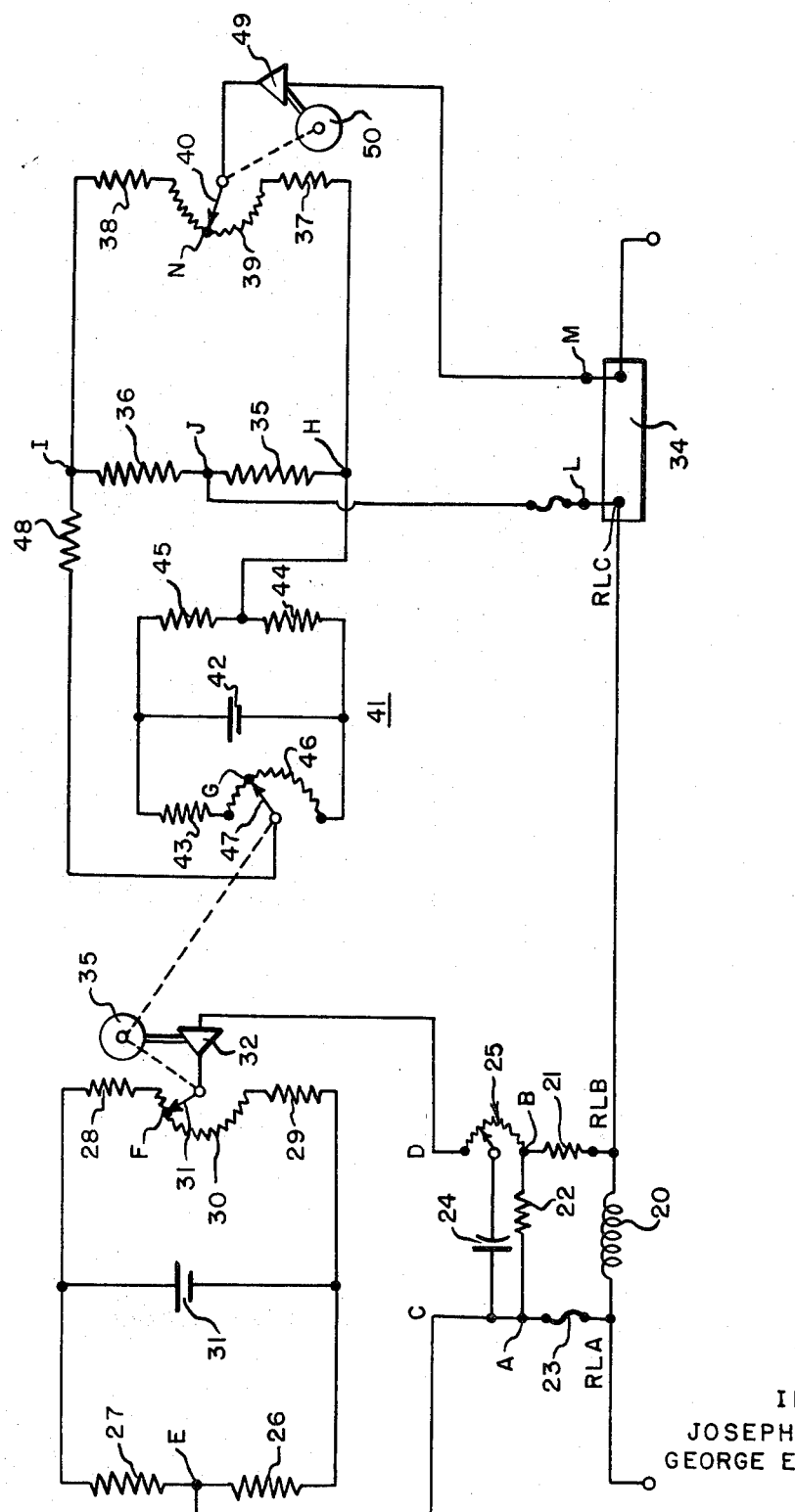

POTENTIOMETRIC RESISTANCE MEASURING SYSTEM

BACKGROUND OF THE INVENTION

The present invention relates to a measuring system of the potentiometric balance type especially adapted for measuring the resistance of an element through which an electric current flows. The system is particularly useful for providing accurate measurements of the resistance of inductive elements which are subject to voltage fluctuations.

It is often desirable to provide a continuous indication of the resistance of a current-conducting element. For example, a common technique for monitoring the temperature of DC-excited motor or generator field windings involves a continuous monitoring of the resistance of the windings. Since the resistance of a winding is a function of the temperature, the output of the resistance-measuring system can be calibrated to indicate the temperature of the winding. Additional apparatus can be provided to trigger an alarm or servo-mechanism if the winding temperature exceeds a predetermined maximum level.

Typical prior art systems for measuring the temperature of motor or generator windings utilize a single potentiometer to measure the winding resistance. In these systems, two voltages are applied to the potentiometer, one voltage being related to the line voltage applied to the motor winding and the other voltage being related to the current flowing through the winding. (The latter voltage is obtained from a shunt inserted in the motor field winding lead.) A suitable mechanism that is sensitive to network unbalance is used to keep the potentiometer in balance by adjusting a rheostat. This mechanism also operates a recorder having a scale calibrated in temperature values.

Such systems, however, have a number of deficiencies. One such deficiency is their inability to provide accurate temperature measurements during periods of voltage fluctuation. Because the windings typically possess a relatively large inductance an increase in current lags behind a voltage increase, in some cases by as much as several seconds. During this time lag, the ratio between the voltage and the current will not provide a true reading of the field temperature but rather will show an abnormally high temperature reading which, in the case of transients, may be sufficient to erroneously trip an auxiliary alarm circuit. One method commonly used to prevent premature alarms due to transients involves the use of very slow recording systems which require 15 to 30 minutes to follow large resistance changes. The disadvantage of such systems, of course, is a considerable delay in the indication of an abnormally high temperature.

Another difficulty arises from errors introduced by the resistance of lead wires and circuit fuses. Lead wires are generally required because it is often necessary that the measuring system be located at a location somewhat removed from the current-carrying element. Both these leads and the fuses necessary to protect the instrument introduce errors into the measured resistance.

SUMMARY OF THE INVENTION

In accordance with the present invention, a system for measuring the resistance of a current-carrying element comprises a pair of coupled, self-balancing voltage measuring instruments of the potentiometer type and an adjustable voltage delay circuit. One of the potentiometers is adapted for measuring the element voltage (after it passes through the voltage delay circuit) by comparing it with a constant reference voltage. The other potentiometer is adapted for measuring the element resistance by comparing this measured element voltage with a voltage corresponding to the current flowing through the element. The voltage delay circuit is designed to delay voltage changes by a time substantially equal to the inductive time lag of the element current, so that the resistance measurement is not significantly affected by such transients. The use of two potentiometers rather than one also renders insignificant errors due to the resistance of leads and protective fuses.

BRIEF DESCRIPTION OF THE DRAWINGS

The nature, features and advantages of the present invention will appear more fully upon consideration of the illustrative embodiments of the invention now to be described in detail in connection with the accompanying drawings:

FIG. 2 is a detailed circuit diagram of one specific example of such a measuring system.

DETAILED DESCRIPTION

Figure 1:
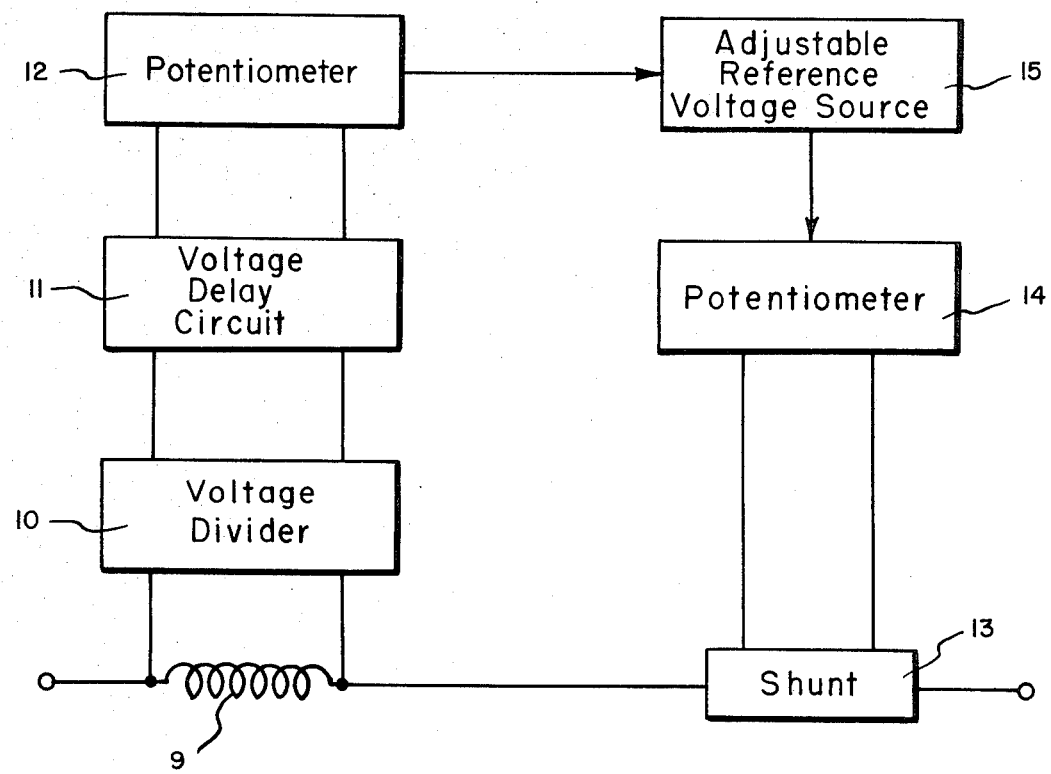
FIG. 1 is a schematic block diagram of one embodiment of a measuring system in accordance with the invention.

In reference to the drawings, FIG. 1 shows a system for measuring the resistance of a current-carrying inductive element 9 such as, for example, a generator field winding. The system comprises a voltage divider 10 for producing a voltage of reduced value proportional to the voltage across element 9, a voltage delay circuit 11 for effecting a time lag in changes of the reduced value voltage, and a voltage measuring instrument 12 of the potentiometer type for measuring the delayed, reduced-value element voltage. By the term voltage measuring instrument of the potentiometer type is meant not only potentiometers but also any other electronic transducer capable of producing an output voltage proportional to an input voltage which has a high degree of isolation between the input circuit and the output circuit and has a sufficiently high input impedance that it does not significantly load the circuit. Preferably, instrument 12 is a self-balancing potentiometer which, as is well known, compares the voltage to be measured with a predetermined reference voltage. The energy or motion required to maintain the potentiometer in balance provides a measure of the unknown voltage.

A second branch of the system begins with a shunt 13 for producing a voltage proportional to the element current and includes a second potentiometric measuring instrument 14 especially adapted for comparing this voltage with a reference voltage which is proportional to the voltage measured by potentiometer 12. This reference voltage may be conveniently obtained in a system using self-balancing potentiometers by using the arrangement for balancing potentiometer 12 to also control an adjustable reference voltage source 15.

The energy or motion required to maintain potentiometer 14 in balance provides a measure of the ratio between the element voltage and the element current and can be used to operate an indicator, such as a recorder, calibrated to show resistance or other quantities, such as temperature, which are related to resistance.

The use of a voltage delay circuit adjusted to produce a voltage time constant approximately equal to the inductive current lag substantially eliminates error introduced by voltage transients, and the use of two separate potentiometers as will be seen by consideration of the detailed circuit diagram below, substantially eliminates error due to the resistance of leads and fuses.

FIG. 2 is a schematic circuit diagram of a specific example of a measuring system in accordance with the invention. The voltage divider connected across the DC-excited, current-carrying element 20 comprises a pair of resistors 21 and 22. The resistance of resistor 21 is chosen to be much larger than that of resistor 22 so that only a small fraction of the element voltage will fall between points A and B. In addition, the resistance is also chosen to be large compared with that of the element so that only a very small current is drawn through leads RLA, RLB, and fuse 23. The resistance of the leads and the fuse will therefore introduce no significant errors in the resistance measurement.

The voltage delay circuit is a simple RC network comprising a capacitor 24 and an adjustable resistor 25. The resistor is conveniently adjusted to introduce a time lag in the voltage measurement equal to the inductive time lag of the current in the element.

The self-balancing potentiometer for measuring the element voltage comprises four fixed-value resistors 26, 27, 28, and 29 and one slidewire resistor 30 arranged to form a bridge around a reference voltage source 31, such as a battery. The values of the resistors are conveniently chosen so that the voltage between points E and F is equal to the voltage between points C and D when the slider 31 contacts slidewire resistor 30 at a predetermined point. A balancing arrangement comprising, for example, a polarity sensitive amplifier 32 in combination with a reversible motor 33 connected to the slider is used to keep the potentiometer in balance. The arrangement is disposed so that a change in the voltage across the element produces a voltage at the input of the amplifier which, in turn, drives the motor until the slider reaches a new position of balance.

A shunt 34 is connected in the lead wire to the current-carrying element in order to produce a voltage drop proportional to the current flowing in the element.

The self-balancing potentiometer for comparing this voltage with that across the element again comprises four fixed value resistors 35, 36, 37, and 38, and a slidewire resistor 39 with a slider 40 arranged to form a bridge around a reference voltage source 41. The values of the various resistors are so chosen that at equilibrium the voltage across points J and N is equal to the voltage developed across the shunt contacts L and M. The reference voltage source, however, instead of being a constant voltage source, is an adjustable voltage source controlled by the balance arrangement of the potentiometer for measuring the element voltage. This adjustable reference source is designed to be always proportional to the measured element voltage. This proportionality may be conveniently maintained by including in the reference voltage source 41 a bridge arrangement comprising a constant voltage source 42, fixed value resistors 43, 44, and 45 and a slidewire resistor 46. Slider 47 can be conveniently connected to reversible motor 33 in such a manner that the motion of the motor which moves slider 31 into a balance position, moves slider 47 into a position of corresponding unbalance. Thus, the bridge arrangement and resistor 48 will produce a voltage between points I and H which is electrically isolated from, but directly proportional to the voltage at points C and D.

This potentiometer also is provided with a balancing apparatus comprising an amplifier 49 and a reversible motor 50. The motor is connected with slider 40 to keep the bridge in balance. Because the bridge is kept in balance, it draws no current from the shunt and is therefore free of errors due to lead or fuse resistance. And since the movement of the slider is proportional to the ratio between the element voltage and element current, it can be calibrated to read resistance, temperature, or any other resistance-dependent quantity.

It is understood that the above described arrangements are merely illustrative of the many possible specific embodiments which can represent applications of the principles of the invention. Thus, numerous and varied other arrangements can be readily devised in accordance with these principles by those skilled in the art without departing from the spirit and scope of the invention.

We claim:

1. A system for measuring the resistance of an inductive current-carrying element comprising:

a voltage delay circuit for producing a voltage to be measured, which voltage to be measured is proportional to the voltage drop across said element and wherein voltage changes are delayed with respect to changes in said voltage drop across said element by a time substantially equal to the inductive time lag of the element current;

a first voltage measuring instrument of the potentiometer type for measuring the voltage produced by said voltage delay circuit;

shunt means for producing a voltage proportional to the current flowing through said element; and a second voltage measuring instrument of the potentiometer type for comparing the voltage measured by said first instrument with the voltage produced by said shunt.

2. A system according to claim 1 wherein said system includes a voltage divider network for reducing the proportion of the element voltage applied to said first instrument and which has a total resistance which is large compared to that of the element.

3. A system according to claim 2 wherein said first and second voltage measuring instruments of the potentiometer type are self-balancing potentiometers.

4. A system according to claim 3 wherein the balancing apparatus of the first self-balancing potentiometer is coupled to an adjustable reference voltage source in the second self-balancing potentiometer for adjusting said reference voltage to a value proportional to the element voltage measured by the first potentiometer.

5. A system according to claim 4 wherein said first and second self-balancing potentiometers each comprise a resistive bridge around a reference voltage source.

6. A system according to claim 5 wherein the reference voltage source of said first self-balancing potentiometer is a constant voltage source and the adjustable reference voltage source of said second potentiometer comprises a resistive bridge which is unbalanced by the balancing arrangement of said first self-balancing potentiometer to produce a voltage proportional to the measured element voltage.

* * * * *